United States Patent

[11] 3,579,275

[72] Inventors Robert W. Polkinghorn
Huntington Beach;
Arthur F. Pfeifer, Whittier; Robert F. Hartmann, Santa Ana; Robert D. Schull, Mission Viejo, Calif.

[21] Appl. No. 789,441
[22] Filed Jan. 7, 1969
[45] Patented May 18, 1971
[73] Assignee North American Rockwell Corporation

[54] ISOLATION CIRCUIT FOR GATING DEVICES
7 Claims, 3 Drawing Figs.

[52] U.S. Cl. .......... 307/251, 307/204, 307/208
[51] Int. Cl. .......... H03k 17/60, H03k 17/60
[50] Field of Search .......... 307/208, 240, 246, 251, 204, 279

[56] References Cited

UNITED STATES PATENTS

| | | | |
|---|---|---|---|
| 3,246,209 | 4/1966 | Multari et al. | 307/246K |
| 3,286,189 | 11/1966 | Mitchell et al. | 307/251X |
| 3,322,974 | 5/1967 | Ahrons et al. | 307/208X |
| 3,393,325 | 7/1968 | Borror et al. | 307/205 |
| 3,395.291 | 7/1968 | Bogert | 307/208X |
| 3,506,851 | 4/1970 | Polkinghorn et al. | 307/251 |

*Primary Examiner*—John S. Heyman
*Attorneys*—William R. Lane, L. Lee Humphries and Robert G. Rogers

ABSTRACT: Capacitors are charged during a first recurring interval of time to turn a MOS device on for connecting an output terminal to ground. The MOS devices comprise part of a buffer or isolating circuit which is interposed between a multiphase gating circuit and the output terminal. During a second recurring interval, the capacitors are conditionally discharged as a function of inputs to the multiphase gating device.

If the capacitors were discharged during the second interval the output remains at ground during a third interval. However, if the capacitors were not discharged, the output is driven to a voltage level from a clock source. The change in the voltage at the output terminal is fed back through one of the capacitors to the gate electrode of the MOS device for driving the output to approximately the voltage level of the clock source.

Since the MOS device is turned on completely, any positive noise on the output of the circuit is neutralized by the current through the MOS device.

A second MOS device may be connected in parallel with the first device to permit the capacitor to be completely discharged to ground during the second interval.

INVENTORS
ROBERT W. POLKINGHORN
ARTHUR F. PFEIFER
ROBERT F. HARTMANN
ROBERT D. SCHULL
BY Robert G. Rogers
ATTORNEY

ISOLATION CIRCUIT FOR GATING DEVICES

BACKGROUND OF THE INVENTION

1. Field of the Invention

This invention relates to an isolation circuit and more particularly to such a circuit using a feedback capacitor for driving the output electrode of a switching device such as a MOS device to approximately clock signal level appearing on its input electrode so that noise appearing on the output electrode is neutralized and for providing a low output impedance.

2. Description of Prior Art

MOS logic circuits such as multiple phase gating circuits, have an inherent speed limitation due to noise capacitively coupled to the output of the circuit and due to the output capacitance of the circuit. The problem could be eliminated if a buffer or isolation MOS circuit could be interposed between the logic circuits and their outputs to neutralize the noise and to overcome the problem associated with output capacitance.

Such a buffer circuit would be particularly suitable for use in a multiphase gating circuit if it could provide a low output impedance during the "true state" of the output. Conventional MOS gating circuits provide high output impedances during the true state of their outputs.

A preferred circuit would also have the capability for discharging the output capacitor to ground to indicate a false ground level and to turn MOS devices of the circuit off when required for proper circuit operation. The present invention provides a buffer circuit having the capabilities indicated above.

SUMMARY OF THE INVENTION

Briefly, the invention is comprised of a feedback capacitor connected between the output electrode and the control electrode of a MOS device having a clock signal on its other electrode. The capacitor is charged and conditionally discharged so that the MOS device is turned on as a function of the charge on the capacitor. The output voltage is fed back through the capacitor to the control electrode of the device for driving the output to approximately the voltage level of the clock source. As a result, noise appearing at the output is neutralized and a low output impedance is provided.

Therefore, it is an object of the invention to provide a buffer circuit between an output terminal and a logic circuit for neutralizing noise at the output, and for reducing the output impedance.

It is another object of this invention to provide a feedback capacitor between the output of a MOS isolation circuit and a control electrode device for driving the MOS device to neutralize noise voltage and to provide a low output impedance.

A still further object of the invention is to increase the switching speed of the voltage on the output terminal of MOS logic circuits by neutralizing noise at the output terminals of the circuits.

It is still another object of this invention to provide a buffer circuit in which the voltage initially appearing on the gate electrode of a MOS device is amplified during the true output state of the buffer circuit It is still a further object of this invention to isolate the gate electrode of the MOS device from the output load of a buffer circuit.

Still another object of this invention is to provide a buffer circuit which drives an output terminal equally well toward voltage levels representing true and false logic states.

A still further object of the invention is to provide a buffer circuit which gates a larger signal to an output terminal than is applied to the gate electrode of a MOS device comprising the circuit.

These and other objects of the invention will become more apparent when taken in conjunction with the following description and drawings, a brief description of which follows:

DESCRIPTION OF THE PREFERRED EMBODIMENTS

Figure 1:
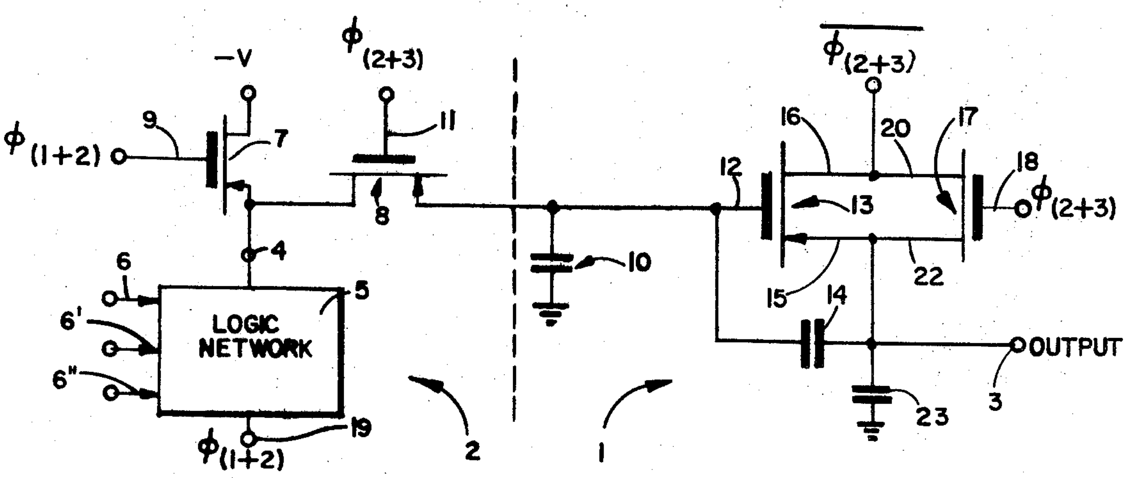
FIG. 1 illustrates one embodiment of a buffer circuit between an output terminal and a multiphase logic gating circuit.

FIG. 1 illustrates a MOS isolation, or buffer circuit 1, connected between multiphase gating circuit 2 and output terminal 3. The gating circuit 2 comprises a two-terminal logic network 5 having logic inputs 6, 6′, and 6″, MOS device 7 connected between voltage source —V and terminal 4 of the logic network 5 and MOS device 8 which is connected between terminal 4 and capacitor 10. Capacitor 10 is used to represent the electrode and conductor capacitance of the output electrode 12 of MOS device 8.

Clock signal $\phi_{1+2}$ is applied to control electrode 9 of MOS device 7 and to terminal 19 of logic network 5. Clock signal $\phi_{2+3}$ is applied to control electrode 11 of MOS device 8 and to control electrode 18 of MOS device 17. The prime of the clock signal $\overline{\phi_{2+3}}$ is applied to electrodes 16 and 20 of MOS devices 13 and 17 respectively.

The buffer circuit 1 comprises MOS device 13 having control electrode 12 connected to output electrode 21 of MOS device 8 and to one electrode of capacitor 10. The other electrode of the capacitor 10 is connected to ground or a suitable bias potential. Electrode 16 of MOS device 13 is connected to clock source $\overline{\phi_{2+3}}$ and to electrode 20 of MOS device 17. Electrode 15 of the device is connected to output terminal 3 and to output electrode 22 of MOS device 17.

Capacitor 23 is shown connected from the output terminal 3 to ground. It is used to represent the electrode and conductor capacitance associated with the output electrodes of MOS devices 13 and 17 and the gate electrode capacitance of MOS devices comprising subsequent stages. Capacitor 14 is connected between the output terminal 3 and to control electrode 12 of MOS device 13 to feed back the output voltage to the control electrode for increasing the drive voltage applied to MOS device 13, as described subsequently.

The buffer circuit also comprises MOS device 17 having its control electrode 18 connected to clock source $\phi_{2+3}$, its output electrode 22 connected to output terminal 3 and its other electrode 20 connected to clock source $\overline{\phi_{2+3}}$. The common connections between MOS device 17 and MOS device 13 were previously described.

Figure 3:
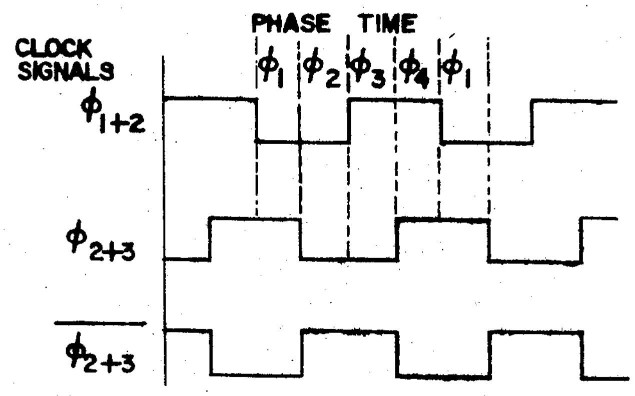
FIG. 3 illustrates the clock signals used by the FIG. 1 embodiment.

The operation of the circuit can best be described in connection with the intervals, or phase times, defined by the clock signals shown in FIG. 3. For example, during $\phi_{1+2}$ time, MOS device 7 is turned on and the inherent capacitance of logic network 5 is precharged. During $\phi_2$ time, MOS device 8 is turned on and capacitor 10 as well as capacitor 14 is conditionally charged to approximately —V. During the $\phi_2$ interval, output 3 is connected to ground since MOS devices 13 and 17 are turned on and since $\overline{\phi_{2+3}}$ is at ground during the $\phi_2$ interval. During $\phi_3$ time, the inputs to the logic network 5 are evaluated and if the logic function implemented by the logic network is true, terminal 19, which is at ground during $\phi_3$ time, is connected through the logic network 5 and through MOS device 8 to discharge capacitors 10 and 14 to ground. However, if the logic function is not true, the capacitors remain charged during $\phi_3$ time.

If the capacitors are charged, during $\phi_3$ time, MOS device 13 is on and remains on during $\phi_4$ time when $\overline{\phi_{2+3}}$ becomes true, or negative, for the embodiment shown.

The change in the output voltage from ground is fed back through the capacitor 14 to increase the drive voltage on the control electrode 12 of MOS device 13. As the drive voltage increases, the output terminal 3 is driven to the voltage level of clock signal $\overline{\phi_{2+3}}$.

In the usual case, capacitors 10 and 14 are charged to −V plus the threshold voltage of either MOS devices 7 or 8 as described above. For example, the capacitors may be charged to approximately −10 volts (assuming a 5-volt threshold drop). If the clock voltage is −15 volts, and if capacitor 14 is substantially larger than capacitor 10, the output terminal could be driven to −15 volts because of the feedback from the output terminal to the gate electrode. That is, the voltage on capacitor 14 would increase from −10 volts to −25 volts while the output increased from 0 to −15 volts. In effect, the MOS device would be gating a larger signal to its output electrode than originally appeared on its gate electrode.

In the case where capacitor 14 is not substantially larger than capacitor 10, the feedback voltage is divided between the two capacitors so that less gate voltage is provided. For example, if the capacitors had a relationship such that capacitor 14 was charged to −17 volts, the output could be driven to only −12 volts (assuming a 5-volt threshold). In that case, the MOS device would amplify the original gate signal.

Generally, the voltage on the gate electrode after the feedback should be greater by at least one threshold than the desired output voltage.

When MOS device 13 is turned on fully, as when the threshold drop is overcome, positive noise appearing at the output is easily neutralized. In addition, since MOS device 13 offers very little resistance between the output terminal and the clock source, a relatively low output impedance is provided. As a result, the output can be quickly switched from a negative voltage to a ground potential and vice versa. In addition, adequate power is available at the output terminal for driving subsequent stages.

During the next interval, $\phi_2$ time, MOS device 17 is turned on to connect the output terminal to ground so that capacitor 14 can be completely discharged in the event the logic function implement by logic network 5 becomes true. If MOS device 17 had not been turned on, and if capacitor 23 is small, capacitor 14 could only have discharged to a voltage equal to the threshold voltage of MOS device 13. As a result, the MOS device could have prematurely turned on as a result of noise voltage, etc. to cause an improper output signal to occur.

If capacitor 23 is large, then MOS device 17 is not necessary because capacitor 23 has sufficient capacity to absorb the current through capacitor 14 when capacitor 14 is being discharged to ground. In effect, if capacitor 23 is large, the output terminal will be held at an approximate ground level until capacitor 14 has been discharged to approximately ground.

In addition, MOS device 17 prevents the output terminal from going positive during $\phi_3$ time when the voltage on control electrode 12 is changed from a negative level to a ground level. Without MOS device 17, the positive voltage could be coupled to the output terminal through capacitor 14 to cause erroneous gating unless the output terminal is connected to a large capacitive load.

It should also be noted that it is only necessary for the logic gating circuit to charge and discharge capacitors 10 and 14 during $\phi_2$ and $\phi_3$ times, respectively, in order to control the voltage on the output electrode. In other words, since capacitor 23 is already charged to ground during $\phi_2$ time, it is necessary only to charge capacitor 14 to ground. In effect, the gate is isolated from the output electrode capacitor 23.

Figure 2:
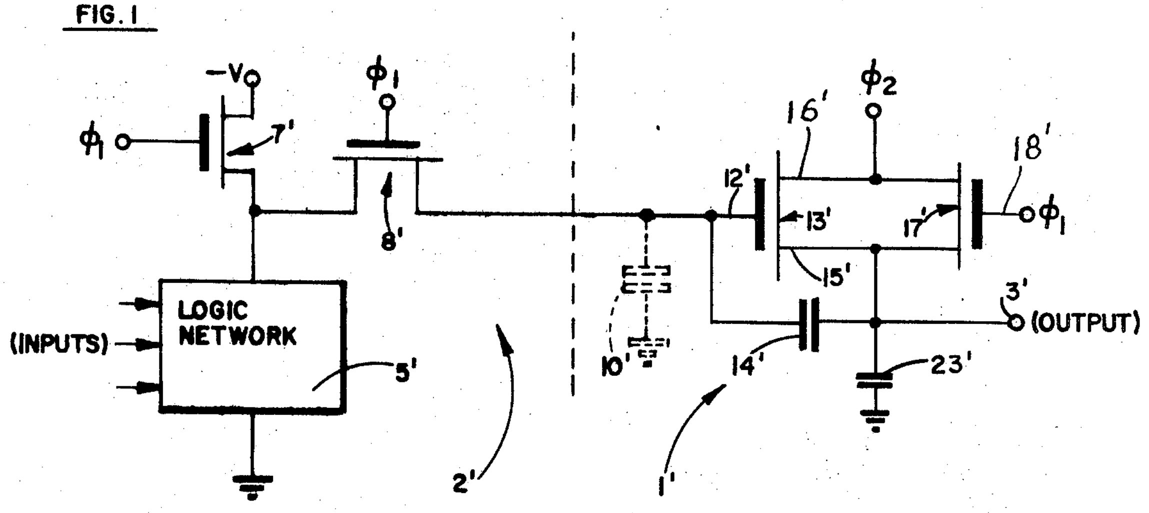
FIG. 2 illustrates a second embodiment of a buffer circuit having a different gating scheme.

FIG. 2 shows a slightly different embodiment of the FIG. 1 system in which clock signals $\phi_1$ and $\phi_2$ are substituted for the clock signals described in connection with FIG. 1. Otherwise, the circuits are the same.

During $\phi_1$ time, MOS devices 7' and 8' of gating circuit 2' are turned on to conditionally charge charge capacitors 10' and 14' to approximately −V as a function of the state of logic network 5'. In other words, if the logic function implemented by the network is true, the capacitors are connected to a ground potential. If the logic function is not true, the capacitors are charged to approximately −V. During $\phi_1$ time, MOS device 17' of buffer circuit is turned on to connect output terminal 3 to ground.

Although device 17 was not necessary in the FIG. 1 embodiment, when capacitor 23 was described as being large, in a two-phase system, as shown in FIG. 2, the device is necessary to unconditionally establish a ground level (false logic level) at the output during $\phi_1$ time.

If capacitors 10' and 14' were charged during $\phi_1$ time, during $\phi_2$ time, MOS device 13' is turned on. As the output becomes more negative, the voltage is fed back through capacitor 14' to increase the drive on control electrode 12' of MOS device 13'. As the drive voltage increases, the threshold drop to MOS device 13' is overcome so that the output electrode 15' of MOS device 13' is driven to the voltage level of the $\phi_2$ clock for reasons described in connection with FIG. 1.

In order for MOS device 13' to remain on and, therefore, provide a low output impedance, it is necessary that the voltage on capacitor 10' and capacitor 14' (electrode 12'), the clock voltage $\phi_2$, and the threshold voltage $V_T$ of the MOS devices be related as follows:

$$(1)\qquad V_{12'}-\phi_2\left(\frac{1}{1+\frac{C_{14'}}{C_{10'}}}\right)>V_T$$

If the capacitance of the feedback capacitor 14 is much greater than the capacitance of capacitor 10', then the gate to output electrode voltage remains approximately constant at the value of the initial output voltage from gating circuit 2'.

The equation is also applicable to the FIG. 1 embodiment.

It should be understood that although MOS switching devices have been illustrated and described, other switching devices such as MNS devices, MNOS devices and other enhancement mode field effect devices can also be used.

It should also be understood that the ground levels described herein generally represent false logic levels. In other embodiments, the false logic levels may be represented by positive or negative voltage levels. In that case, the true voltage levels appearing on the output electrodes would have a value which would be relatively different.

While there has been shown what is considered to be the preferred embodiment of the present invention, it will be manifest that many changes and modifications may be made therein, without departing from the essential spirit of the invention. It is intended, therefore, in the annexed claims, to cover all such changes and modifications as may fall within the true scope of the invention.

We claim:

1. A buffer circuit between an output terminal and a logic gating circuit comprising, a first switching device having a control electrode connected to said logic gating circuit, an output electrode connected to said output terminal, and another electrode connectable to a clock signal, said logic gating circuit providing drive voltages to said control electrode for rendering said first switching device conductive and nonconductive as a function of the voltage levels of said drive voltages, capacitor means connected between said output electrode and said control electrode for feeding back voltage on the output terminal to the control electrode during one interval of said clock signal when the first switching device is conductive for increasing the drive voltage of said first switching device until the voltage on the output terminal is greater than the voltage on the output terminal at the beginning of said one interval, a second switching device connected in parallel with said first switching device for connecting the output terminal to a voltage level representing a false logic state during the interval prior to said one interval of said clock signal.

2. A buffer circuit between an output terminal and a logic gating circuit comprising, a first switching device connected between a clock signal and an output electrode and having a control electrode connected to said logic gating circuit, said logic gating circuit providing drive voltages to said control electrode for rendering said first switching device conductive and nonconductive as a function of the voltage levels of said drive voltages, capacitor means connected between said output electrode and said control electrode for feeding back voltage on the output terminal to the control electrode during one interval of said clock signal when the first switching device is conductive for increasing the drive voltage of said first switching device until the voltage on the output terminal attributed to said clock signal is greater than the voltage on the output terminal at the beginning of said one interval, a second switching device connected in parallel with the first switching device to connect the output terminal to a voltage representing a false logic state during an interval prior to said one interval for preventing a drive voltage level which would render said first switching device nonconductive during said one interval from being coupled to the output terminal across said capacitor means.

3. A field effect transistor isolation circuit between an output terminal having load capacitance associated therewith and a logic gating circuit which provides drive voltages having voltage levels representing logic states to said isolation field effect transistor circuit during certain recurring intervals, said circuit comprising, a first field effect transistor connected between a phase recurring clock signal and said output terminal and having a gate electrode connected to said logic gating circuit, said first phase recurring clock signal having a voltage level representing a logic false state when the logic gating circuit is providing a drive voltage to said gate electrode, and a voltage level representing a logic true state during the interval after a drive voltage is provided to said gate electrode by said logic gating circuit, feedback capacitor means connected between the output terminal and said gate electrode for feeding back voltage on the output terminal to the gate electrode during the interval that the voltage level of the first phase recurring clock signal represents a logic true state and when the drive voltage on the gate electrode renders said first field effect transistor conductive, said feedback voltage increasing the drive voltage on the gate electrode for enhancing the conduction of the field effect transistor until the voltage on the output terminal is increased from the voltage initially on the output terminal is increased from the voltage initially on the output terminal at the beginning of the feedback interval, said load capacitance at the output terminal being large relative to said capacitor means for maintaining said output terminal at a voltage level representing a false logic state during the interval when said logic gating circuit provides a change from a previous interval in drive voltage from a voltage level representing a true logic state to a voltage level representing a false logic state and for enabling said capacitor means to charge to the difference between the drive voltage provided by said logic gating circuit and the voltage level on the output terminal during an interval when the drive voltage has a level representing a true logic level whereby the voltage being fed back across said capacitor means from the output terminal causes an increase in the voltage on said gate electrode in excess of the voltage on said capacitor means at the beginning of said interval.

4. The isolation circuit recited in claim 3 wherein a second field effect transistor is connected in electrical parallel with said first field effect transistor.

5. An isolation circuit between an output terminal having load capacitance and a logic gating circuit, said circuit comprising, a first field effect transistor connected between a phase recurring clock signal and said output terminal and having a gate electrode, said logic gating circuit providing drive voltages to said gate electrode for controlling the conduction of said first field effect transistor, feedback capacitor means connected between said output terminal and said gate electrode for feeding back a voltage level on said output terminal when said first field effect transistor is rendered conductive by a drive voltage, the feedback voltage having an amplitude approximately equal to the voltage level of said phase recurring clock signal, said feedback capacitor means being small relative to said load capacitance for maintaining said output terminal at a required voltage level when the voltage level at the gate electrode of said first field effect transistor is changed from one voltage level to a different voltage level by a drive voltage from said logic gating circuit.

6. The isolation circuit recited in claim 5 wherein said logic gating circuit provides a first drive voltage level for rendering said first field effect transistor conductive during a first phase of said phase recurring clock signal, said clock signal having a second voltage level during said first phase, said output terminal being set to said second voltage level for enabling said feedback capacitor means to charge to the difference between said first and second voltage levels, and during a second phase of said phase recurring clock signal if the drive voltage changes to a second voltage level for rendering said first field effect transistor nonconductive, the size of the load capacitance relative to the feedback capacitor means enabling said output terminal to remain at the second voltage level at least for said second phase.

7. The isolation circuit recited in claim 6 wherein said first drive voltage level represents a true logic state, said second voltage level represents a false logic state, said phase recurring clock signal having a voltage level representing a true logic state during said second phase whereby when said first field effect transistor is rendered conductive by a drive voltage representing a true logic state at the beginning of said second phase, said voltage level at the output terminal being initially reduced by a threshold voltage drop across said first field effect transistor, the feedback of the initial voltage level through said feedback capacitor means to said gate electrode enhancing the conduction by said first field effect transistor for overcoming said threshold drop whereby the output terminal is driven to the voltage level of said phase recurring clock signal during said second phase.